United States Patent [19]

Favreau

[11] Patent Number: 5,458,090
[45] Date of Patent: Oct. 17, 1995

[54] OPEN SANITARY DEVICE FOR DOGS AND CATS

[75] Inventor: Jean Favreau, Corbie, France

[73] Assignee: Nestec S.A., Vevey, Switzerland

[21] Appl. No.: 16,721

[22] Filed: Feb. 11, 1993

[30]   Foreign Application Priority Data

Mar. 6, 1992 [EP]   European Pat. Off. ............ 92103829

[51] Int. Cl.$^6$ .................................................. A01K 29/00
[52] U.S. Cl. .................................................. 119/163
[58] Field of Search .................... 119/161, 162, 119/163, 165, 166; 4/661, 255.01, 255.04, 313

[56]   References Cited

U.S. PATENT DOCUMENTS

| 4,729,342 | 3/1988 | Loctin ................................. | 119/163 |
| 5,003,920 | 4/1991 | Miksitz ................................ | 119/163 |

FOREIGN PATENT DOCUMENTS

| 2334290 | 8/1977 | France ................................. | 119/161 |
| 2384448 | 11/1978 | France ................................ | 119/163 |
| 2740867 | 3/1979 | Germany ............................. | 119/161 |

*Primary Examiner*—Gene Mancene
*Assistant Examiner*—Thomas Price
*Attorney, Agent, or Firm*—Vogt & O'Donnell

[57]   ABSTRACT

A toilet for animals has a horizontal part for an animal to stand upon and a vertical part integral with the horizontal part. The vertical part contains a reservoir for containing litter, and a dispenser system is associated with the reservoir for dispensing litter from the reservoir onto the horizontal part. A water distributor is positioned at the bottom of the vertical part beneath the reservoir and dispensing system for flushing the horizontal part. A flushing discharge system has a siphon which extends from an orifice in the horizontal part, and an inlet to the siphon supplies water for flushing the siphon. At least one cell is positioned for detecting the presence of an animal on the horizontal part and for controlling a flushing and litter dispensing sequence when the animal has left the horizontal part.

11 Claims, 3 Drawing Sheets

OPEN SANITARY DEVICE FOR DOGS AND CATS

BACKGROUND OF THE INVENTION

This invention relates to an open toilet system for animals having a flushing system and litter dispensing system and a detector of animal use for controlling flushing and litter dispensing.

French Patent No. 2 584 568 describes a toilet system for domestic animals. This known system minimizes the need for human intervention in its operation, is automatic and guarantees almost perfect cleanness. However, it is attended by several disadvantages which are, on the one hand, that it is complicated and hence relatively expensive to buy, and on the other hand, it confines the animal in an enclosed space, which is undesirable in the light of results of studies on animal behaviour. Finally, it has been found that domestic animals, above all cats, like to do their business on litter.

SUMMARY OF THE INVENTION

The toilet according to the present invention provides consumers—both in their homes and in catteries or kennels—with a simple, automatic and clean system which guarantees the animal a high degree of freedom and enables it to do its business on litter which is renewed after each cleaning.

The present invention provides to a toilet system for cats and dogs comprising a litter reservoir and an associated dispenser for placing litter on the horizontal part and at least one cell for detecting the presence of the animal on the horizontal part and for controlling the flushing and litter replacement sequence when the animal has left the horizontal part, the flushing means being formed by a water distributor at the bottom of the vertical part and the system for discharging the wastewater being of the siphon type comprising an additional inlet for flushing water at the lower end of the siphon.

The water distributor is powerful enough to move the litter and excrement towards the wastewater discharge pipe, although, to accelerate flushing, it is preferable to provide an additional water inlet at the lower end of the siphon. The water, both for the distributor and for the siphon, is taken directly from the normal supply, i.e., at the pressure of the main supply.

DESCRIPTION OF PREFERRED EMBODIMENTS

In the system according to the invention, there is an electrical control box which is responsible for the automatic operation of the toilet system. To this end, it comprises a microprocessor. The box is connected to the cell for detecting the presence of the animal, to an electromagnetic sluice valve controlling the delivery of flushing water, to a second electromagnetic sluice valve controlling the delivery of water to the siphon and to the litter dispensing system.

The water distributor comprises nozzles arranged at regular intervals along its length over the entire width of, and close to, the horizontal part.

The litter reservoir and its dispensing system are arranged in the vertical part above the water distributor. The litter is of the mineral or vegetable type, preferably a vegetable, biodegradable type.

The litter dispensing system is not critical. It should merely be a system which always dispenses the same amount of litter. For example, the dispensing system may be of the lock-gate type. Two cells for detecting the presence of the animal are provided in the system, the emitter cell being situated on the vertical part above the litter dispensing system and the receiver cell being situated on the horizontal part opposite the water distributor. At all events, these cells must be positioned in such a way that the presence of an animal doing its business can be reliably detected.

To facilitate cleaning and flushing of the horizontal part, it is inclined at a certain angle, for example, on the order of 5° to 15°, relative to the horizontal. The orifice of the system for discharging wastewater is situated in the lowest part of the substantially horizontal plane opposite the distributor for the flushing water.

The litter reservoir has a capacity of 20 to 80 liters which ensures that the system is self-sufficient for prolonged periods, for example, on the order of 40 days where a single cat is using the system.

The remaining description refers to the accompanying drawings, and the mode of operation of the system according to the invention also is described in more detail below with reference to the drawings.

DETAILED DESCRIPTION OF THE DRAWINGS

Figure 1:
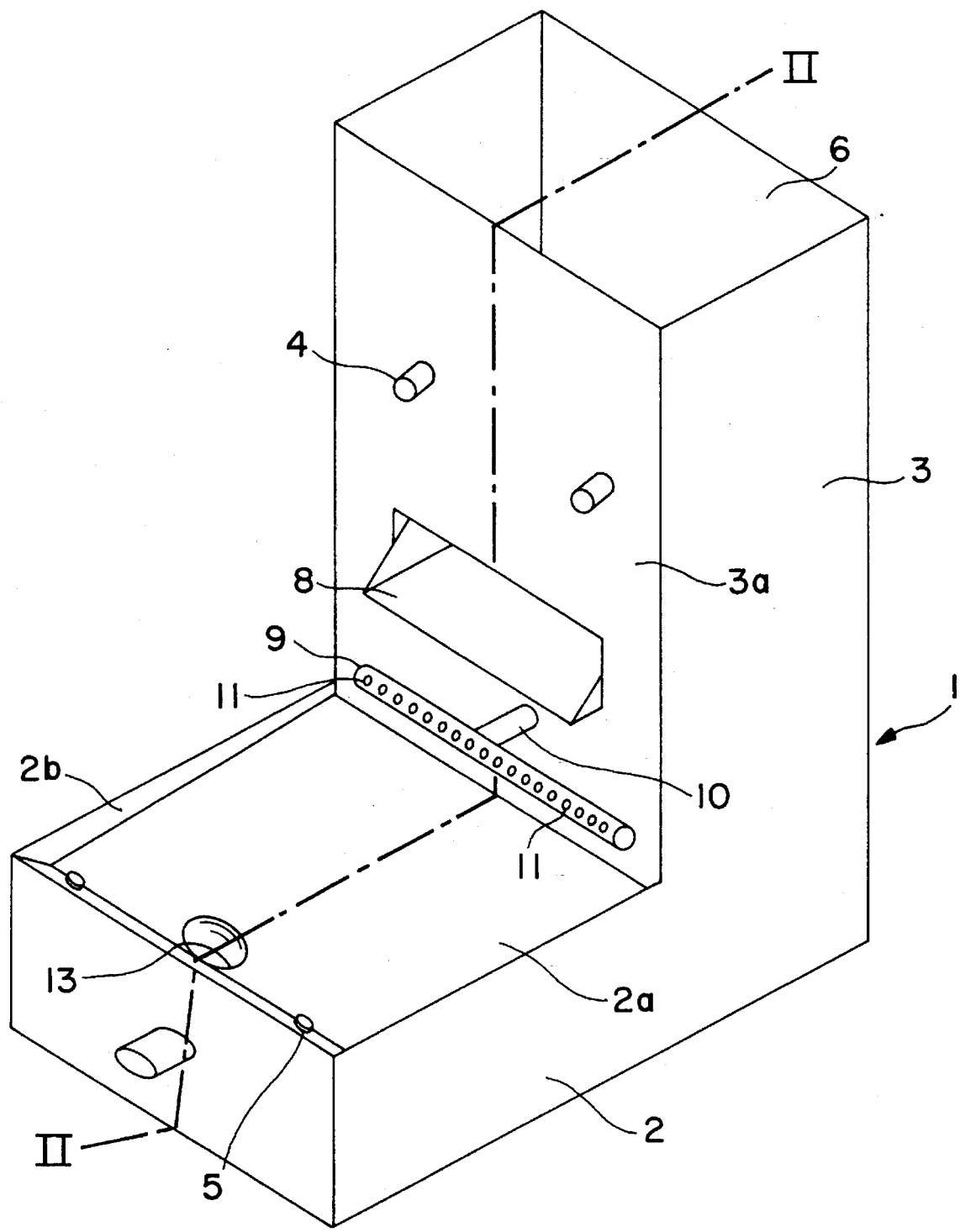
FIG. 1 is a perspective view of the toilet system according to the invention.
Figure 2:
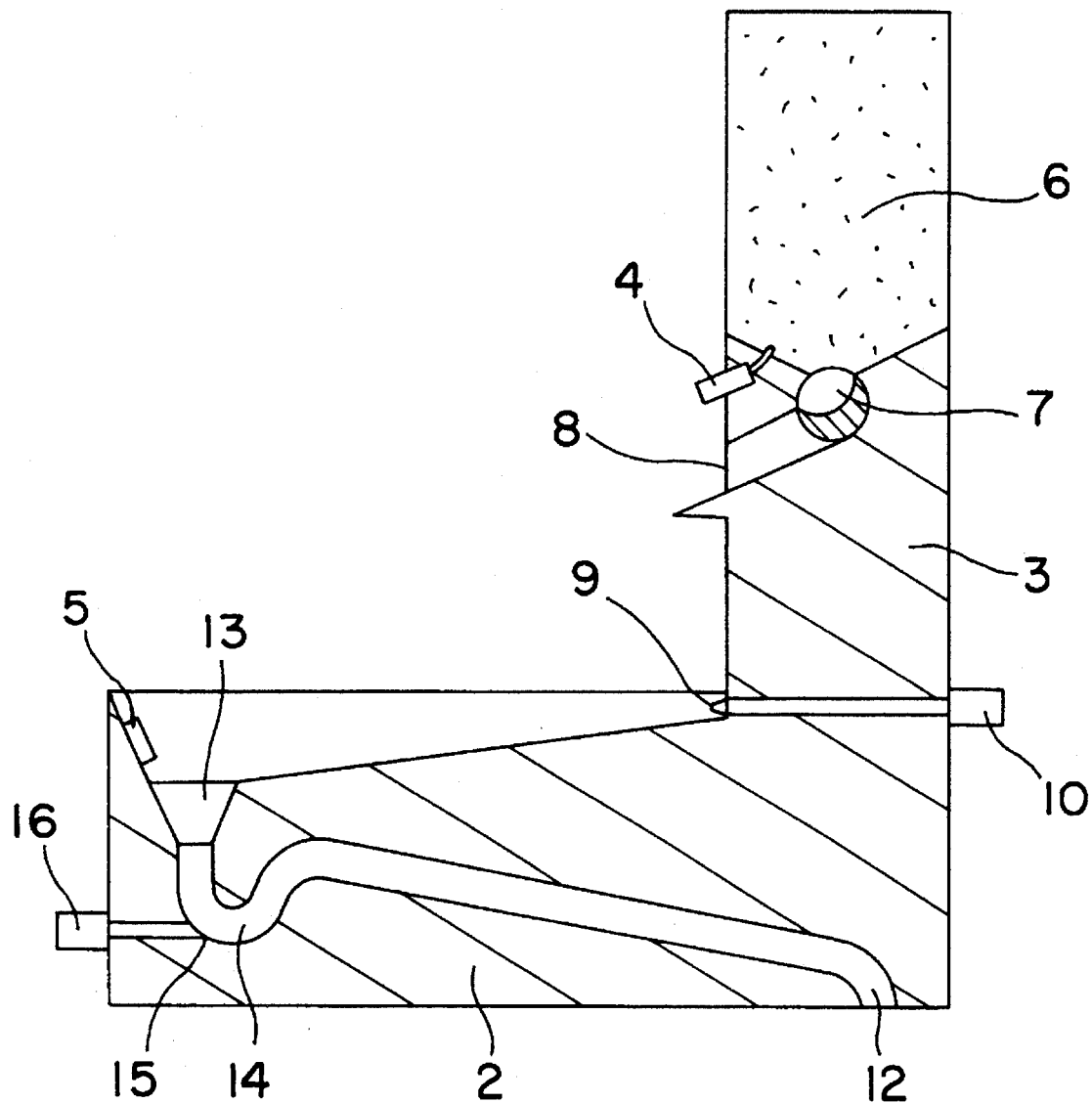
FIG. 2 is a section on the line II—II of FIG. 1.

Referring to FIGS. 1 and 2, the toilet system (1) according to the invention comprises a horizontal part (2) and a vertical part (3). The horizontal part has a surface portion (2a) for an animal to stand upon, and as illustrated, a lip (2b), which bounds the surface portion, forms a boundary about the surface portion, and the vertical portion has a wall portion (3a) which intersects surface portion 2(a) and through which water distributor (9) extends. The emitter cells (4) of the system for detecting the presence of the animal are arranged in the vertical part (3) while the receiver cells (5) are arranged in the horizontal part (2). The litter reservoir (6) is illustrated with a lock-gate dispensing system (7) having at its lower end and an opening (8) for discharging the litter onto the horizontal part (2). The inclination of the horizontal part (2) can clearly be seen in FIG. 2.

The water distributor (9) is connected to a water feed pipe (10). An illustrated in FIG. 1, the distributor comprises nozzles (11) arranged at regular intervals in the wall portion (3a). These nozzles may have diameters on the order of 5 mm. The system (12) for discharging waste-water comprises a discharge orifice (13) and a siphon passage (14) which extends from the surface portion orifice (13) (FIG. 2). An additional inlet passage (15) for flushing water arriving through a pipe (16) is provided in the siphon passage (14).

Figure 3:
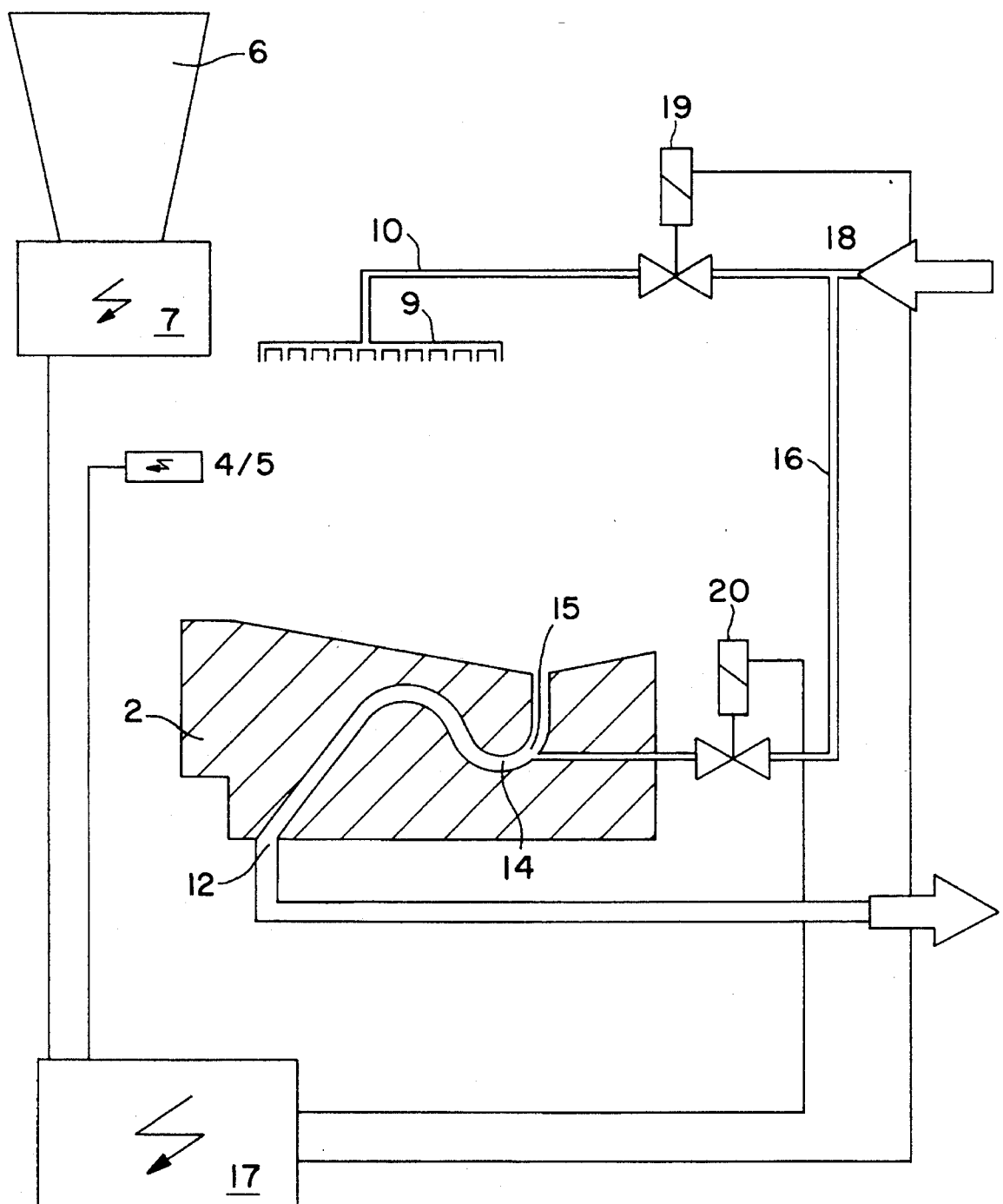
FIG. 3 is a basic diagram of the electronic circuits of the system.

In operation, and with reference to FIG. 3, the electrical control box (17) integrated in the toilet system, for example beneath the litter dispenser, controls the automatic operation of the toilet system. The toilet system is supplied with electricity and is connected to the water supply by the pipe (18). In its starting position, it awaits the arrival of an animal. When the cat arrives on the horizontal part (2), it is detected by the cells (4,5). After doing its business, it leaves the part (2). The microprocessor of the box (17) is programmed to allow the cat time to leave the toilet and then actuates the electromagnetic sluice valves (19,20) to open the water feed pipes (10,16) so that the litter and excrement are removed. Flushing lasts approximately 1 minute and the electromagnetic sluice valves close the water feed pipes.

There is then another time interval for drying the horizontal part and, finally, the litter dispensing system (7) turns to deliver a predetermined quantity of litter onto the horizontal part (2). The toilet is then ready to receive another animal.

In one practical embodiment, the toilet system according to the invention has a height of 1.2 m, a width of 0.5 m and a depth of 0.7 m. The litter reservoir has a capacity of 60 l. The flushing cycles last 1 minute, delivering 4 liters of water per cycle.

I claim:

1. A flushing toilet system for animals comprising:
   a first part and a second part integral with the first part which are configured for the first part being positioned to extend horizontally and for the second part to extend vertically from the first part and wherein, with respect to a horizontal positioning of the first part, the first part has a surface portion for an animal to stand upon and the second part has a wall portion which intersects and extends transversely from the surface portion;
   means for distributing flushing water comprising a water distributor positioned in the second part to extend through the wall portion for distributing water onto the surface portion for flushing the surface portion;
   a reservoir positioned in the second part for containing litter and a dispensing system which is positioned in the second part and which includes an outlet opening positioned in the wall portion for dispensing litter from the reservoir onto the surface portion, wherein the reservoir and dispensing system are positioned so that the water distributor is positioned between the dispensing system outlet and the intersection of the surface portion and the wall portion;
   a flushing discharge system comprising a siphon passage and a surface portion orifice which extends through the surface portion at a position displaced away from the intersection of the surface portion and the wall portion, wherein the siphon passage extends from the orifice, for removing flushings from the surface portion and comprising an inlet passage connected to the siphon passage at, with respect to a horizontal positioning of the first part, a lower end of the siphon passage for supplying water for flushing the siphon passage;
   at least one cell for detecting the presence of an animal on the surface portion; and a microprocessor electrically connected to the at least one cell for controlling a sequence of flushing and dispensing of litter by, respectively, the means for distributing flushing water and the dispensing system.

2. A toilet system according to claim 1 wherein, with respect to a horizontal positioning of the first part, the surface portion is inclined downwards from the intersection of the surface portion and the wall portion to a position displaced away from the intersection.

3. A toilet system according to claim 2 wherein the surface portion inclines at an angle of from about 5° to about 15°.

4. A toilet system according to claim 1 wherein the water distributor comprises a plurality of spaced-apart nozzles.

5. A toilet system according to claim 1 or 2 or 3 wherein the first part further comprises a lip which bounds the surface portion for forming a boundary about the surface portion.

6. A toilet system according to claim 5 wherein there are two cells and wherein one cell is positioned on the wall portion and the second cell is positioned on the lip for detecting the presence of an animal.

7. A toilet system according to claim 2 or 3 wherein the first part further comprises a lip which bounds the surface portion for forming a boundary about the surface portion and wherein the orifice is positioned adjacent the lip at, with respect to a horizontal positioning of the first part, a lowest position of the incline.

8. A toilet system according to claim 1 wherein the means for distributing flushing water further comprises a sluice valve electrically connected to the microprocessor for actuating the sluice Valve for controlling delivery of water for flushing the surface portion.

9. A toilet system according to claim 1 or 8 wherein the means for distributing flushing water further comprises a pipe passage connected to the inlet passage for supplying water for flushing the siphon passage and a pipe passage sluice valve electrically connected to the microprocessor for activating the pipe passage sluice valve for controlling delivery of water for flushing the siphon passage.

10. A toilet system according to claim 1 wherein there are two cells electrically connected to the microprocessor and wherein one cell is positioned on the wall portion and the second cell is positioned on the first part for detecting the presence of an animal.

11. A toilet according to claim 1 wherein the dispensing system comprises a lock-gate dispenser for dispensing litter.

* * * * *